United States Patent
Brugh, Jr. et al.

[11] 3,958,056
[45] May 18, 1976

[54] FIBERBOARD CARTON PRODUCT

[75] Inventors: Latane D. Brugh, Jr.; John W. Smith, Jr., both of Covington, Va.

[73] Assignee: Westvaco Corporation, New York, N.Y.

[22] Filed: July 25, 1975

[21] Appl. No.: 599,156

Related U.S. Application Data

[60] Continuation-in-part of Ser. No. 398,215, Sept. 17, 1973, abandoned, which is a division of Ser. No. 207,376, Dec. 13, 1971, Pat. No. 3,802,984.

[52] U.S. Cl. ............................... 428/215; 229/3.1; 428/220; 428/511; 428/513; 428/514
[51] Int. Cl.² .................... B32B 27/10; B32B 29/00
[58] Field of Search ............ 428/213, 215, 220, 511, 428/513, 514; 229/3.1

[56] References Cited
UNITED STATES PATENTS

| | | | |
|---|---|---|---|
| 3,194,469 | 7/1965 | Rumberger | 428/457 X |
| 3,194,474 | 7/1965 | Rumberger | 229/3.1 X |
| 3,194,872 | 7/1965 | Garner | 428/138 X |
| 3,263,891 | 8/1966 | Brugh, Jr. | 229/3.1 |
| 3,466,852 | 9/1969 | Stoner | 54/65 |
| 3,600,262 | 8/1971 | Frank | 156/309 X |
| 3,713,881 | 1/1973 | Akiyama et al. | 428/452 |
| 3,717,534 | 2/1973 | Duling et al. | 156/309 |

*Primary Examiner*—William J. Van Balen
*Assistant Examiner*—Henry F. Epstein
*Attorney, Agent, or Firm*—W. Allen Marcontell; Richard L. Schmalz

[57] ABSTRACT

A moisture vapor impermeable sheet for the fabrication of hygroscopic particulate material container cartons having small cross-machine direction curl propensity, said sheet being projecting lamination of a thin film of thermoplastic polymer material between opposite laminae of high and low density cellulosic fiber sheets, the low density sheet being permeated with water subsequent to lamination and reeled in a straight line cross-direction configuration for at least 20 minutes.

10 Claims, 5 Drawing Figures

FIBERBOARD CARTON PRODUCT

CROSS-REFERENCE TO RELATED APPLICATIONS

This is a Continuation-In-Part of application Ser. No. 398,215 filed Sept. 17, 1973 and now abandoned. Said application Ser. No. 398,215 is a Division of application Ser. No. 207,376 filed Dec. 13, 1971, which issued on Apr. 9, 1974 as U.S. Pat. No. 3,802,984.

BACKGROUND OF THE INVENTION

1. Field of the Invention

The present invention relates to the product and process for manufacturing moisture vapor impermeable cartons predominately from sheets of cellulosic fiber material that are suitable for packaging hygroscopic particulate material.

2. Description of the Prior Art

Due to an emerging public awareness of the cumulative deterimental impact on the environment of certain industrial and consumer waste compounds, the manufacture, shipment and marketing of some products and commodities has been exhaustively reviewed. Among such reviewed products are household detergents which historically have contained phosphate compounds to enhance the cleaning and dispersion properties thereof.

Since phosphate compounds originating from commercial detergent blends are thought to contribute significantly to the nutrient support of oxygen consuming organisms in natural streams and water bodies, powdered detergent manufacturers have sought more suitable, nutrient free alternatives for phosphates. Although many such alternatives have been found, nitrilotriacetic acid (NTA) for example, most if not all of such available alternatives are considerably more hygroscopic than the older phosphate compounds. Moreover, said alternatives are more susceptible to congealing and caking when subjected to water vapor. Accordingly, pressure has been brought to bear on the fiber carton suppliers to provide a more moisture vapor resistant package for the new, hygroscopic detergents.

Although there are many ostensibly suitable moisture-proof packaging materials and techniques available to detergent manufacturers, the criteria of cost, performance and attractiveness favor the selection of bleached paper board for the carton material. Accordingly, various laminated combinations of paper board, wax and/or thermoplastics have been proposed and used in the past.

Functionally, prior art systems of carton stock as represented by the U.S. Pat. Nos. 3,194,469 and 3,194,474 to George G. Rumberger have generally performed the intended purpose satisfactorily. It is the criteria of practicality and economics on which such prior art systems have fallen short of acceptability. Basically, prior art laminated carton stock is susceptible to severe warping and curling in the cross-machine direction (CD): i.e., the product web of uniform width and indefinite length curls about an axis parallel with the length thereof. The mechanisms of such warping and curling are present in the laminated composite as it emerges from the laminating machine and even though subsequently reeled and stored in a true cylindrical configuration with straight line surface elements, no correction of the CD curl is provided. Moreover, the undesirable curl condition is aggravated by passage through the multiple color stations of a rotogravure printing press.

Such curling and warping is believed to be caused by stress differentials between opposite face planes of the laminated sheet stock. When a vapor impermeable strata of thermoplastic separates face laminae of fiberboard, equalizing migration of moisture between the respective porous laminae is precluded. If one laminae is subject to more severe drying conditions than the other, an internal stress differential is thereby created and results in a bending or warping of the composite.

An example of such unequal drying conditions arises in a rotogravure printer where heat is applied to the printed face to drive out excess solvent deposited thereon as vehicle for the ink pigment. On the printed side of the vapor barrier, the fiberous laminae remains in moisture equilibrium. On the unprinted or liner side of the vapor barrier, subject to transversely conducted heating but without benefit solvent additions, a net drying occurs. Accordingly, a moisture content and consequent stress differential results.

SUMMARY OF THE INVENTION

It is therefore, an objective of the present invention to produce a laminated, vapor-proof carton board with novel combinations of characteristic properties which, when combined as a composite, laminated sheet system, meet the rigid specifications set by detergent manufacturers.

Another object of the present invention is to process the novel web composite in such manner as to minimize curl and warp tendencies thereof.

Another object of the subject invention is to provide a vapor impermeable carton board having a high quality exterior printing surface but at least equal in vapor transmissivity to wax coated cartons.

Another object of the present invention is to provide a vapor impermeable carton having a greater thermal strength capacity than available from wax coated cartons.

A still further object of the present invention is to provide a vapor impermeable carton having a high degree of adhesive flexibility and reliability.

These and other objects of the invention may be achieved by the judicious combination of several, singularly subtle, but collectively significant, discoveries. Such discoveries include the finding that resistance to score cracking of a laminated composite is enhanced by including a low strength, low density liner sheet in the combination. Adhesive bonds to the printed laminae are increased by using greater quantities of polyvinyl acetate resin binders with the surface coating clays therefor. Curling and warping are significantly reduced by the mechanical application of water to the composite liner sheet subsequent to lamination but prior to winding for storage/transport. Additional water may be applied before or following gravure printing to further preclude curling of the carton blanks after they are cut.

DESCRIPTION OF THE PREFERRED EMBODIMENT

Figure 1:
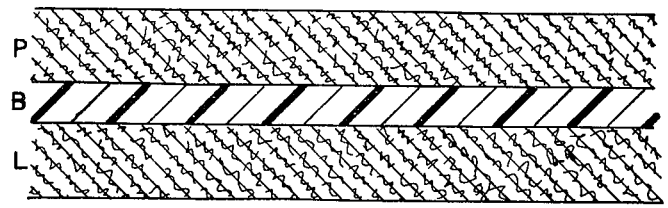
FIG. 1 is an enlarged cross-sectional view of the laminated sheet according to the invention.

Referring initially to FIG. 1 for a description of the basic laminated system of the present invention there is shown two face laminae of cellulosic fiber material P and L separated by a vapor barrier film B of suitable thermoplastic polymer material such as polyethylene.

Layer P, which serves as the outer or printed face of a carton, is of 10 to 16 caliper, 10.0 to 11.6 lbs./ream/-caliper bleached paper board, fourdrinier formed and treated with a conventional clay surface coating comprising clay and polyvinyl acetate binder. Unconventional, however, is the quantity of binder used in relation to clay. A normal percentage of binder relative to a unit weight of clay pigment applied to bleached board carton stock is 18 percent whereas the present invention employs approximately 20–35 percent. This coating is applied at the rate of 9 to 11 lbs./ream (3,000 square feet of surface area per ream).

It has been found that the greater percentage of polyvinyl acetate allows a stronger adhesive bond with resin glues also of a polyvinyl acetate resin base. Moreover, adhesive strength of dextrin glued joints is enhanced due to attenuation of chalk failure at the joint interface. Chalk failure is used to describe that form of glued joint separation caused by the failure of an adhesive to penetrate beyond the clay surface coat and bond to the fiber substrate leaving a joint of no greater strength than that provided by the bond between the fiber and the clay surface coat.

The liner sheet L of the FIG. 1 lamination is preferably of low density (approximately 8.5 to 9.0 lbs/ream/-caliper), 8 to 27 caliper fiber board, fourdrinier formed from unbleached hardwood sulphate pulp. The desired low bond strength, 40 to 70 units on the Scott Bond Scale, may be achieved from a mixture of pulp furnish comprising 40 to 60 percent virgin hardwood sulphate pulp, with the remainder comprising substantially equal percentages of recycled news and kraft box stock.

These proportions may be varied widely, however, to take optimum advantage of momentary economics.

Reference to U.S. Pat. No. 3,263,891 will provide additional teaching on the composition and forming of a suitable low density liner board.

Liner L of the present invention differs from the unusual run of low density stock in that the present liner is treated with an application of clay-starch sizing mixture comprising approximately 5 percent starch solids and 7.5 percent clay expressed as a weight function of the water vehicle. In terms of application rates, 2.4 lbs. starch/ream and 3.6 lbs. clay/ream have been found sufficient.

Although sizing is conventionally applied to other types of paper, cup stock for example, it is not customary to do so with box board liner stock. It seems that the presence of clay improves the quick tack characteristic: a highly desirable property for carton stock to be mechanically assembled.

The vapor barrier B comprises a 0.5 to 1.5 mil thickness of 0.916 to 0.936 gm/cm$^3$ polyethylene or similar vapor impermeable thermoplastic polymer material extruded into a merging nip 50 (FIG. 2) between continuous webs of bleached board P and liner board L. In terms of application rate, the thermoplastic vapor barrier may be deposited between the two fiberous layers at the rate range of 7.1 to 21.8 lbs./ream. The rate of 14.4 lbs./ream of 0.918 gm/cm$^3$ polyethylene has been found to be a satisfactory economic compromise. This rate provides a barrier thickness of approximately 1 mil.

Other suitable polymer alternatives may include, polybutylene, butylrubber, polyisobutylene, polyvinylacetate, polyvinylbutyral, polymethylmethacrylate, polyvinyl chloride, and polyamides. Selective criteria for such alternatives would include a density range of 0.915 to 0.950 grams per cubic centimeter and, if to be applied by extrusion, a melt index of between 3 and 11. The melt index is a standardized industry viscosity scale for thermoplastic polymers measured in grams of material extruded through an 0.082 inch orifice in 10 minutes at 190°C under the pressure exerted by a 2160 gram piston in a 0.375 inch cylinder.

In addition, U.S. Pat. No. 3,194,474 teaches, at column 8, line 53 and continuing, that certain moisture-vapor-proof hot melt adhesives based on petroleum waxes may be suitable.

The use of thermoplastic polymer alternatives to polyethylene may suggest a different thickness relative to the density of the specific alternative selected. For example, polypropylene should be 0.4 to 1.25 mil whereas polyvinylidene chloride should be laid to a thickness of from 0.25 to 0.75 mil.

Under pressure of the nip between rolls 14 and 24 the hot, viscous polyethylene is fused into the respectively adjacent surfaces of webs P and L to structurally unitize the two into a single, laminated composite C.

It has been found that the aforedescribed laminated web has a Moisture Vapor Transmission (MVT) value range of 1.2 to 1.8 gms/100 in.$^2$/24 hrs. at 100°F and 95 percent relative humidity when tested with sodium chloride as the desiccant. Similar tests on wax coated cartons yield MVT values of 0.15 to 0.20 gms/100 in.$^2$/24 hrs. Surprisingly, however, when tested with NTA combined detergents, a typical end use product, cartons fabricated according to the present invention perform significantly better whereas wax coated cartons perform significantly worse. In this case, performance of the respective materials seems to merge at the 0.8 to 0.9 gms/100 in.$^2$/24 hrs. level. When combined with the superior machinability and esthetic quality of bleached board outer laminae over wax coated materials, the MVT performance of the present invention is alone sufficient to tip the competitive balance in favor of the invention. In addition, however, the invention is considerably less heat sensitive in the normal range of exposure. Further superiority is claimed for the property of score cracking. The low bond strength liner of my invention serves to relieve destructive stresses within the outer laminae by collapsing and compressing when the carton blank is folded along the score lines. Moreover, the vapor barrier of wax coated cartons is often broken along score lines whereas the barrier of the present invention is protected from such damage and is more elastic.

Although laminated composite board of this type tends to curl in the machine direction (MD), i.e., about an axis transverse of the web length, as well as the CD, such MD curl is more tolerable due to the fact that it may be largely corrected mechanically by decurling devices. Moreover, the mechanics of MD curl seem to relate to the relative tensions of the two fibrous webs at the point of lamination; a single, mechanically variable parameter.

Correction of CD curl is another matter entirely and is complicated by the fact that CD web shrinkage may vary with humidity changes as much as four times that of the MD variation. The presence of the vapor barrier B between the two fibrous sheets, each of different density, prevents the transverse migration of moisture between the respective sheets to further compound the difficulty. Moreover, undesirable CD curl may develop on the laminating machine or in transit through a rotogravure printing machine. Accordingly, CD curl preventative measures must be taken on both machines.

Figure 2:
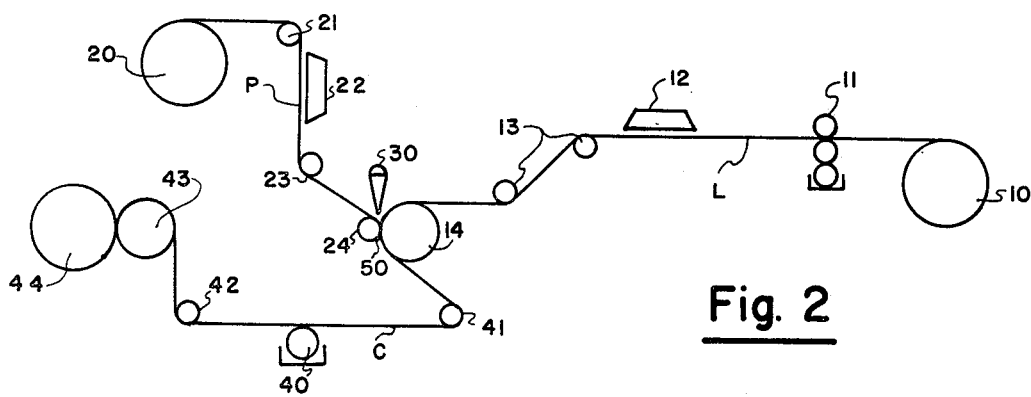
FIG. 2 is a schematic representation of a laminating machine for combining and final processing of the several laminae of the invention.

Process measures taken with the invention in the lamination procedure are described relative to FIG. 2 where a web laminating machine is shown schematically. Low density liner board L as described above is drawn from a supply roll 10 and passed through the nip between primer rolls 11 where an adhesive promoting material is applied if necessary. Thereafter, the web L may be exposed to the flame of a Flynn burner section 12 which preheats the web and oxidizes the surface thereof preparatory to receipt of the hot film polyethylene. Turning rolls 13 direct the web L into the nip 50 between pressure rolls 14 and 24.

The bleached board carton exterior laminae P, supplied from roll 20, is directed by turning rolls 21 and 23 in front of the flame of a second Flynn burner unit 22 and subsequently into the laminating nip 50.

Continuous extruder unit 30 deposits the hot viscous film of polyethylene or other thermoplastic polymer material directly into the nip 50 to bond the respective board webs L and P together and erect a vapor barrier therebetween.

Upon emerging from nip 50, the laminated composite web C is turned around roll 41 for passage over gravure cylinder 40 for the uniform deposit of water on and within web face L. Thereafter, web C is turned about roll 42 onto winding roll 43 for building of spool 44.

If a laminated web is to develop a curl, it will do so within 15 or 20 minutes after spool winding. By rewetting the liner sheet L at 800–1000 feet per minute with a gravure cylinder of 40 to 100 lines per inch applying 1.7 lbs. water/ream, a 0.015 inch thickness of 8.8 lbs./ream/caliper sample of the specified liner board laminated by a 1 mil thickness of 0.918 gm/cm$^3$ polyethylene to a 0.012 inch thickness of 11.1 lbs./ream/caliper of specified bleached board took no CD curl set after 30 minutes of resident time on a cylindrical spool. In this example, the amount of water added to the liner was 0.5 percent of the laminated composite sheet weight to give a final total moisture content of the composite of 6.5 percent.

Laboratory tests on the laminated composite of the invention have also shown that if the liner of a laminated composite sheet with curl tendency is moistened within a range of 0.9 to 2.5 lbs./water/ream and then pressed, the sheet will retain the pressed configuration. If the sheet is subsequently exposed to atmospheres with varying degrees of relative humidity, it will not change curl nearly so much as an unmoistened sheet.

It should be added that the upper limit of water application is usually limited by the nature of subsequent process operations. If the laminated composite is to be die cut, it would not be advisable to exceed a total moisture content of 7 percent for the composite.

Figure 3:
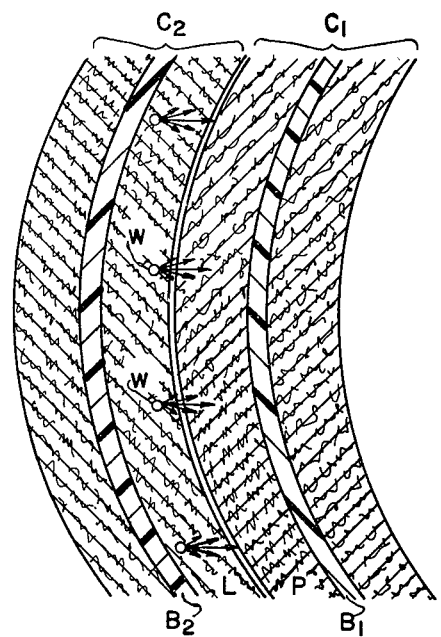
FIG. 3 is an enlarged cross-sectional segment of a laminated sheet storage reel showing two successive wraps of the sheet thereon.

Although the mechanics of how and why CD curl occurs and how the combined parameters and practices of this invention attenuate the development thereof is largely a matter of conjecture, the following analysis relates to the theoretical holding that if a discrete quantity of excess moisture is applied to the liner laminae, stress equalizing moisture migration occurs across the interface between liner and bleached board laminae of successive composite wraps on a spool. This sequence is illustrated by FIG. 3 where the composite $C_1$ is wrapped such that bleached board print laminae P lies on the outer periphery thereof. The next wrap, $C_2$ of the composite places the liner portion thereof in direct juxtaposition against layer P of the previous wrap between vapor barriers $B_1$ and $B_2$.

In terms of the foregoing theoretical analysis, the excess moisture in layer L may transversely migrate only into the adjacent outer elements of layer P due to the encapsulation effect of vapor barriers $B_1$ and $B_2$ as indicated by the moisture vectors W in FIG. 3. Greatest accommodation of said excess moisture by layer P is given by the outer elements thereof nearest the interface with layer L and diminishes with depth to the vapor barrier. Since the strength modulus of both fibrous layers diminishes in inverse proportion to the internal relative humidity, internal stresses respective to the two layers causes yielding thereof beyond the proportional limit to a stress stabilization point in the straight cylindrical surface direction.

Said moisture remains encapsulated within the labyrinth between vapor barriers thereby preserving the low yield property until the laminated composite is reeled from the roll 44 whereupon the relative internal stresses of the two cellulosic layers may be statically stabilized in the flat configuration. Thereafter, the excess moisture may escape the cellulosic system to a relatively dryer atmosphere to leave the board with its original strength modulus.

Although the moisture content of layer P may be raised mechanically in a manner similar to the simple technique employed by the invention with layer L, other considerations incident to a modern production laminating machine web speed of 1000 feet per minute and greater vastly complicate such an approach. The first of such other considerations is the greater density of the layer P board. For such dense board, time is the most significant factor in moisture permeation; a precious commodity on such rapid production equipment. Conversely, where the printing and cutting of cartons takes place at a location physically remote from the laminating site, permeation time is the most economical commodity. Accordingly, the invention extends the laminating process time into the product storage and transit realm. Experimentation has shown that a minimum of 15 to 30 minutes storage time in the reeled condition is sufficient to neutralize most CD curl.

Figure 4:
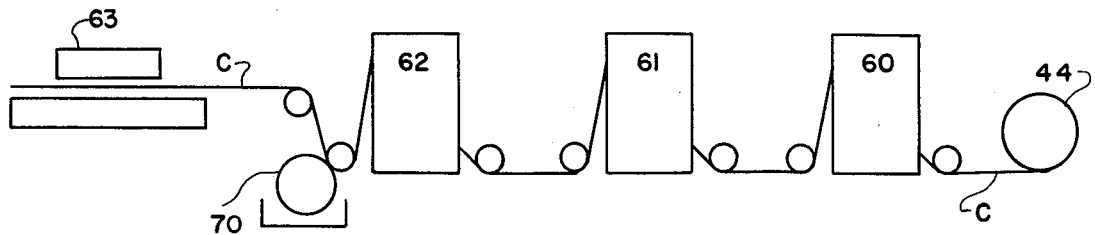
FIG. 4 is a schematic representation of rotogravure printing and die cutting machine constructed according to the teachings of the invention.
Figures 5, 6:
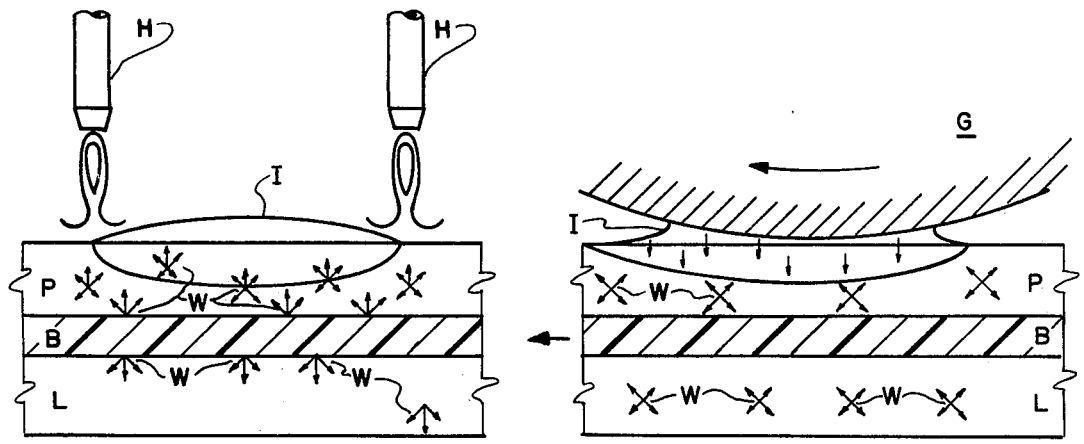
FIG. 5 is an enlarged cross-section of a laminated sheet segment passing through the ink application nip of a gravure printer.
FIG. 6 is an enlarged cross-section of a laminated sheet segment passing the dryer section of a gravure printer.

For related reasons, curl or warp in the subject carton stock may also develop in the printing process. Such a process is schematically represented by FIG. 4 where the web of laminated stock is drawn from reel 44 and passed through a series of rotogravure printing presses and finally cut into carton blanks by die 63. Within each printing unit 60, 61 and 62, ink I is applied to the surface of layer P by gravure cylinder G to increase the total liquid content thereof as shown in FIG. 5. The moisture balance of layer L is uneffected by said liquid addition to layer P due to the vapor barrier B. Subsequently, the wet printed surface of layer P is dried by heaters H (FIG. 6) which are regulated to transfer sufficient heat to the layer P to evaporate as much moisture and solvent therefrom as applied by the gravure cylinder G in the exposure time allotted. Vapor barrier B is no obstacle to the conductive transfer to heat, however, which also serves to dry the liner layer L. Moreover, the heating environment allows substantial convective drying. Lacking the equalizing provision of the ink, layer L becomes relatively drier than layer P thereby contracting with increased rigidity. These conditions are shown in FIGS. 5 and 6 with moisture vectors W illustrating the liquid migration patterns therein.

By rewetting layer L with a gravure cylinder 70 positioned between the final printing unit 62 and the cutting die 63, the internal stress equilibrium of the composite may be restored.

If necessary, other rewetting cylinders 70 may be positioned along the composite web path C between printer 60, 61 and 62 to assist the maintenance of registry therebetween.

It is to be understood that the foregoing description is of a preferred embodiment and that the invention is not limited to the specific property combinations, apparatus and incidental process steps shown and described. Therefore, changes may be made in the described preferred embodiment without departing from the scope of the invention.

We claim:

1. A vapor permeable resistant carton construction material having high adhesive bonding strength and resistance to score cracking comprising first and second laminae of cellulosic fiber sheets separated by a lamina of thermoplastic polymer material bonded to oppositely facing surface planes of said first and second fiber sheets;
    said first fiber sheet comprising a substantially 10 to 16 caliper thickness of substantially 10.0 to 11.6 lbs./ream/caliper density sheet, surface coated with a mixture of clay and a polyvinyl acetate resin binder wherein said binder comprises substantially 20 to 35 percent of said clay weight;
    said second fiber sheet comprising a substantially 8 to 27 caliper thickness of substantially 8.5 to 9.0 lbs./ream/caliper density sheet formed from substantially 40 to 60 percent virgin hardwood unbleached sulphate pulp furnish.

2. A carton construction material as described by claim 1 wherein said thermoplastic polymer lamina has a density between 0.915 and 0.950 grams per cubic centimeter and a melt index of between 3 and 11.

3. A carton construction material as described by claim 1 wherein said thermoplastic polymer lamina comprises a substantially 0.5 to 1.5 mil thickness of polyethylene.

4. A carton construction material as described by claim 1 wherein said thermoplastic polymer lamina comprises a substantially 0.4 to 1.25 mil thickness of polypropylene.

5. A carton construction material as described by claim 1 wherein said thermoplastic polymer lamina comprises a substantially 0.25 to 0.75 mil thickness of polyvinylidene chloride.

6. A carton construction material as described by claim 1 wherein said first fiber sheet is fourdrinier formed from bleached pulp furnish.

7. A carton construction material as described by claim 1 wherein said second fiber sheet is surface coated with a solution of clay-starch sizing.

8. A vapor permeable resistant carton construction material having high adhesive bond strength and resistance to score cracking comprising first and second laminae of cellulosic fiber sheets separated by a substantially 0.5 to 1.5 mil lamina of polyethylene material bonded to oppositely facing surface planes of said first and second fiber sheets;
    said first fiber sheet comprising a substantially 10 to 16 caliper thickness of substantially 10.0 to 11.6 lbs./ream/caliper density sheet, surface coated with a mixture of clay and a polyvinyl acetate resin binder wherein said binder comprises substantially 20 to 35 percent of said clay weight;
    said second fiber sheet comprising a substantially 8 to 27 caliper thickness of substantially 8.5 to 9.0 lbs./ream/caliper density sheet formed from substantially 40 to 60 percent virgin hardwood unbleached sulphate pulp furnish.

9. A carton construction material as described by claim 8 wherein said first fiber sheet is fourdrinier formed from bleached pulp furnish.

10. A carton contruction material as described by claim 8 wherein said second fiber sheet is surface coated with a solution of clay-starch sizing.

* * * * *